(12) United States Patent
Gozu (10) Patent No.: US 12,070,904 B2
(45) Date of Patent: Aug. 27, 2024

(54) MATERIAL DISPENSING DEVICE, THREE-DIMENSIONAL SHAPING DEVICE, AND INJECTION MOLDING DEVICE

(71) Applicant: SEIKO EPSON CORPORATION, Tokyo (JP)

(72) Inventor: Masayuki Gozu, Ina (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/100,595

(22) Filed: Jan. 24, 2023

(65) Prior Publication Data

US 2023/0264421 A1    Aug. 24, 2023

(30) Foreign Application Priority Data

Jan. 25, 2022    (JP) .................................. 2022-009597

(51) Int. Cl.
| | | |
|---|---|---|
| *B33Y 40/00* | (2020.01) | |
| *B29C 45/18* | (2006.01) | |
| *B29C 64/321* | (2017.01) | |
| *B29C 64/343* | (2017.01) | |
| *B29C 64/393* | (2017.01) | |
| *B33Y 10/00* | (2015.01) | |
| *B33Y 50/02* | (2015.01) | |

(52) U.S. Cl.
CPC ........ *B29C 64/343* (2017.08); *B29C 45/1808* (2013.01); *B29C 64/321* (2017.08); *B29C 64/393* (2017.08); *B33Y 10/00* (2014.12); *B33Y 40/00* (2014.12); *B33Y 50/02* (2014.12); *B29C 2045/1891* (2013.01)

(58) Field of Classification Search
None
See application file for complete search history.

(56) References Cited

U.S. PATENT DOCUMENTS

| | | | |
|---|---|---|---|
| 2018/0015673 A1* | 1/2018 | Lee ....................... | B29C 64/393 |
| 2018/0281284 A1* | 10/2018 | Elgar .................... | B29C 64/371 |
| 2019/0054695 A1* | 2/2019 | Chanclon ................. | B08B 5/04 |
| 2020/0262147 A1* | 8/2020 | Mamrak ............... | B29C 64/343 |
| 2021/0060837 A1 | 3/2021 | Anegawa | |
| 2021/0205889 A1* | 7/2021 | Roure Pastor .......... | B22F 12/90 |
| 2022/0024075 A1* | 1/2022 | Martin .................. | B33Y 10/00 |
| 2022/0305733 A1* | 9/2022 | Solidum ............... | B29C 64/343 |

FOREIGN PATENT DOCUMENTS

JP    2021-035736 A    3/2021

* cited by examiner

*Primary Examiner* — Yung-Sheng M Tsui
(74) *Attorney, Agent, or Firm* — Harness, Dickey & Pierce, P.L.C.

(57) ABSTRACT

A material dispensing device includes a material storage unit that stores a material therein and has an outlet portion at a lower portion thereof, and a dispensing unit that dispenses the material dispensed from the outlet portion to an outside with at least a part of the material being plasticized. The material dispensing device includes a remaining amount detection unit that detects a remaining amount of the material stored in the material storage unit from above the material storage unit. A three-dimensional shaping device includes the material dispensing device that dispenses a material for shaping, and a stage on which the material dispensed from the material dispensing device is stacked.

7 Claims, 8 Drawing Sheets

MATERIAL DISPENSING DEVICE, THREE-DIMENSIONAL SHAPING DEVICE, AND INJECTION MOLDING DEVICE

The present application is based on, and claims priority from JP Application Serial Number 2022-009597, filed Jan. 25, 2022, the disclosure of which is hereby incorporated by reference herein in its entirety.

BACKGROUND

1. Technical Field

The present disclosure relates to a material dispensing device, and a three-dimensional shaping device and an injection molding device that include the material dispensing device.

2. Related Art

An example of this type of three-dimensional shaping device is disclosed in JP-A-2021-35736. JP-A-2021-35736 discloses a three-dimensional shaping device including a material storage unit that stores a material, and a melting unit that melts the material supplied from the material storage unit to form a shaping material. Further, it is disclosed that a remaining state of the material stored in the material storage unit is detected by an optical sensor provided at an outer side surface of the material storage unit.

In a case of the material storage unit as described in the above document, the material is supplied from one outlet of the material storage unit toward the melting unit. Therefore, a surface of the material stored in the material storage unit may be a mortar-shaped surface in which a portion corresponding to a center of the outlet is recessed. In such a case, a remaining amount of the material may not be accurately measured in a structure in which the remaining amount is detected from the outer side surface of the material storage unit.

SUMMARY

To solve the technical problem described above, a material dispensing device according to the present disclosure includes: a material storage unit configured to store a material therein and having an outlet portion at a lower portion thereof; a dispensing unit configured to dispense the material supplied from the outlet portion to an outside with at least a part of the material being plasticized; and a remaining amount detection unit configured to detect a remaining amount of the material stored in the material storage unit from above the material storage unit.

A three-dimensional shaping device according to the present disclosure includes a material dispensing device configured to dispense a material for shaping, and a stage on which the material dispensed from the material dispensing device is stacked. The material dispensing device is the material dispensing device including the remaining amount detection unit.

An injection molding device according to the present disclosure includes a material dispensing device configured to dispense a material for injection molding, and a fixing unit configured to fix a mold that receives the material dispensed from the material dispensing device. The material dispensing device is the material dispensing device including the remaining amount detection unit.

DESCRIPTION OF EXEMPLARY EMBODIMENTS

Hereinafter, the present disclosure will be schematically described first.

To solve the technical problem described above, a material dispensing device according to a first aspect of the present disclosure includes: a material storage unit configured to store a material therein and having an outlet portion at a lower portion thereof; a dispensing unit configured to dispense the material supplied from the outlet portion to an outside with at least a part of the material being plasticized; and a remaining amount detection unit configured to detect a remaining amount of the material stored in the material storage unit from above the material storage unit.

According to the present aspect, the remaining amount detection unit detects the remaining amount of the material stored in the material storage unit not from a side surface direction of the material storage unit but from above. Accordingly, even when the material stored in the material storage unit has a recessed mortar-shaped surface, it is possible to make the measurement less likely to be affected by the mortar-shaped surface, and therefore the remaining amount of the material can be accurately and easily measured.

The material dispensing device according to a second aspect of the present disclosure is directed to the first aspect, in which the remaining amount detection unit is a distance measurement sensor that is disposed above the material storage unit and measures a distance to a target based on an emission wave to the target and a reflected wave from the target. Examples of such a distance measurement sensor include an optical sensor, an ultrasonic sensor, and a radio wave sensor.

According to the present aspect, since the remaining amount detection unit is a sensor that measures the distance in a non-contact manner, such as the optical sensor, the remaining amount detection unit can be easily designed and manufactured.

The material dispensing device according to a third aspect of the present disclosure is directed to the second aspect, in which the distance measurement sensor emits the emission wave toward a center of the outlet portion.

According to the present aspect, the distance measurement sensor emits the emission wave toward the center of the outlet portion. Accordingly, since the distance measurement sensor measures the distance to a lowest portion of the mortar-shaped surface, it is possible to prevent in advance the material from not being dispensed from the material storage unit.

The material dispensing device according to a fourth aspect of the present disclosure is directed to the second aspect or the third aspect, in which the material storage unit includes a member having a hole that forms a passage of the emission wave, and the emission wave passes through the hole in a state where the material storage unit is attached to a predetermined position.

According to the present aspect, the emission wave passes through the hole in a state where the material storage unit is attached to a predetermined position. In other words, in a state where the material storage unit is not attached to the predetermined position, the emission wave cannot pass through the hole. Accordingly, it is possible to easily check whether the material storage unit is correctly attached to the predetermined position.

A three-dimensional shaping device according to a fifth aspect of the present disclosure includes: a material dispensing device configured to dispense a material for shaping from a dispensing unit; and a stage on which the material dispensed from the material dispensing device is stacked. The material dispensing device is the material dispensing device including the remaining amount detection unit.

According to the present aspect, since the material dispensing device includes the remaining amount detection unit, effects of the aspects by the material dispensing device can be obtained as the three-dimensional shaping device.

The three-dimensional shaping device according to a sixth aspect of the present disclosure is directed to the fifth aspect, further including: a first movement unit configured to move the material storage unit and the dispensing unit in a first direction perpendicular to the stage; a second movement unit configured to individually move the material storage unit in the first direction; a third movement unit configured to individually move the dispensing unit in the first direction; and a control unit configured to control movement operations of the first movement unit, the second movement unit, and the third movement unit. During shaping, the control unit causes the third movement unit to move the dispensing unit, and causes a dispensing port of a nozzle included in the dispensing unit to be closer to the stage than during a period other than during the shaping. That is, the dispensing port is positioned at a shaping position.

According to the present aspect, during the shaping, the control unit causes the third movement unit to move the dispensing unit, and causes the dispensing port of the nozzle included in the dispensing unit to be closer to the stage than during the period other than during the shaping. That is, the dispensing port is positioned at the shaping position. Accordingly, the effects of the aspects of the material dispensing device can be obtained.

The three-dimensional shaping device according to a seventh aspect of the present disclosure is directed to the sixth aspect, further including: a first regulating unit fixed to the first movement unit; and a second regulating unit fixed to the material storage unit. When the control unit causes the second movement unit to move the material storage unit toward the stage, the movement of the material storage unit is regulated at a position where the first regulating unit and the second regulating unit are in contact with each other.

According to the present aspect, when the material storage unit is moved in the direction toward the stage by the second movement unit, the movement of the material storage unit by a predetermined distance or more is regulated by the contact between the first regulating unit and the second regulating unit. Accordingly, during a dispensing operation of the material by the dispensing unit, the dispensing unit is positioned independently of, that is, separated from the material storage unit. Therefore, it is possible to reduce a possibility that a dispensing position of the dispensing unit is displaced.

The three-dimensional shaping device according to an eighth aspect of the present disclosure is directed to the sixth aspect or the seventh aspect, further including: a first contact unit fixed to the material storage unit; and a second contact unit fixed to the dispensing unit. When the control unit causes the third movement unit to move the dispensing unit in a direction away from the stage, the second contact unit and the first contact unit come into contact with each other and push up the material storage unit in cooperation with the second movement unit.

According to the present aspect, when the control unit causes the third movement unit to move the dispensing unit in a direction away from the stage, the second contact unit and the first contact unit come into contact with each other and push up the material storage unit in cooperation with the second movement unit. This cooperation makes it easy to increase a capacity of the material storage unit, or makes it possible to reduce a size of a driving source of the second movement unit.

An injection molding device according to a ninth aspect of the present disclosure includes: a material dispensing device configured to dispense a material for injection molding from a dispensing unit; and a fixing unit configured to fix a mold that receives the material dispensed from the material dispensing device. The material dispensing device is the material dispensing device including the remaining amount detection unit.

According to the present aspect, since the material dispensing device includes the remaining amount detection unit, effects of the aspects by the material dispensing device can be obtained as the injection molding device.

First Embodiment

Hereinafter, a material dispensing device and a three-dimensional shaping device including the material dispensing device according to a first embodiment will be specifically described with reference to FIGS. 1 to 7.

In the following description, three axes orthogonal to one another are defined as an X axis, a Y axis, and a Z axis, respectively, as shown in the drawings. A Z-axis direction corresponds to a vertical direction, that is, a direction in which gravity acts. An X-axis direction and a Y-axis direction correspond to a horizontal direction. In the drawings, a direction indicated by each of arrows of the three axes (X, Y, and Z) is a +direction of each direction, and an opposite direction is a −direction.

Figure 1:
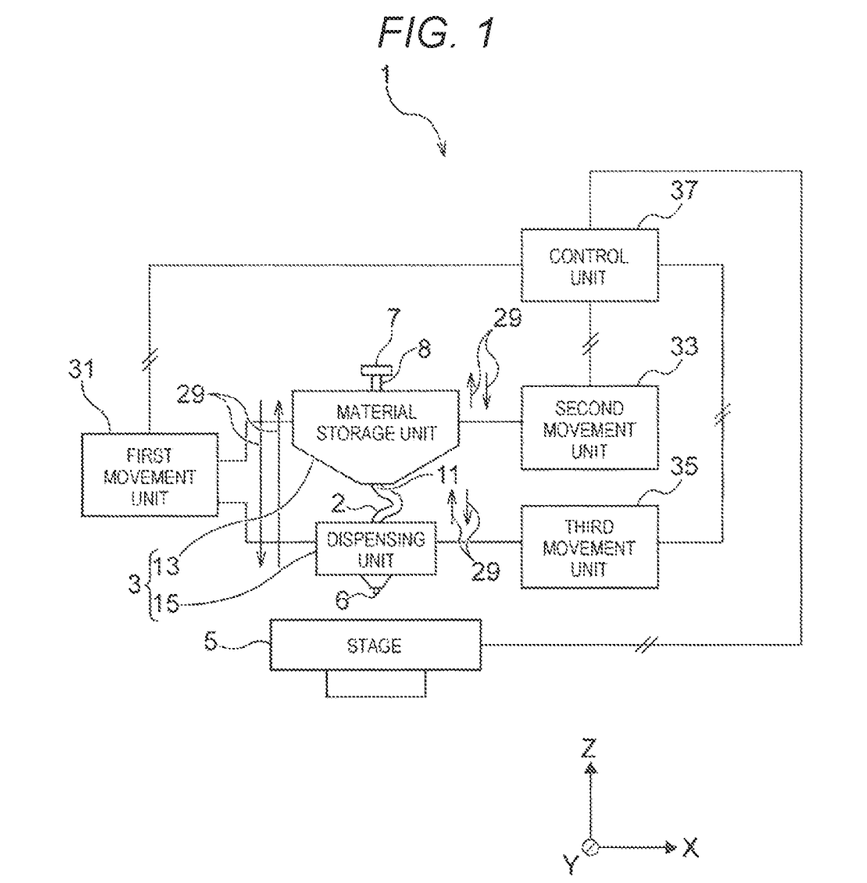
FIG. 1 is a schematic configuration diagram of a three-dimensional shaping device according to a first embodiment.

As shown in FIG. 1, a three-dimensional shaping device 1 according to the present embodiment includes a material dispensing device 3 that dispenses a material 9 for shaping (see FIG. 4) from a dispensing unit 15, and a stage 5 on which the material 9 dispensed from the material dispensing device 3 is stacked. The material dispensing device 3 includes a remaining amount detection unit 7, which will be described later. The three-dimensional shaping device 1 further includes a control unit 37 that controls a stacking operation of the material 9 from the material dispensing device 3 to the stage 5.

Here, the material 9 is a filler-containing resin fluid as an example plasticized by a plasticizing unit 4 (see FIG. 2) included in the material dispensing device 3. The term "dispense" is used in a meaning including both a case where the material 9 of the fluid is pushed out continuously in a string shape from an outlet and a case where the material is dispensed in a granular state.

The material dispensing device 3 according to the present embodiment includes a material storage unit 13 that stores the material 9 therein and has an outlet portion 11 at a lower portion thereof, and the dispensing unit 15 that dispenses the material 9 from the outlet portion 11 to an outside in a state where at least a part of the material 9 is plasticized by the plasticizing unit 4. The material dispensing device 3 further includes the remaining amount detection unit 7 that detects a remaining amount of the material 9 stored in the material storage unit 13 from above the material storage unit 13.

The outlet portion 11 of the material storage unit 13 and the dispensing unit 15 are communicated with each other by a tube 2. The granular material 9 in the material storage unit 13 reaches an inside of the dispensing unit 15 through the tube 2. The material is plasticized by the plasticizing unit 4 in the dispensing unit 15 to become a fluid that can be dispensed, and the fluid is dispensed onto the stage 5 from a dispensing port 6 of the dispensing unit 15.

Figure 2:
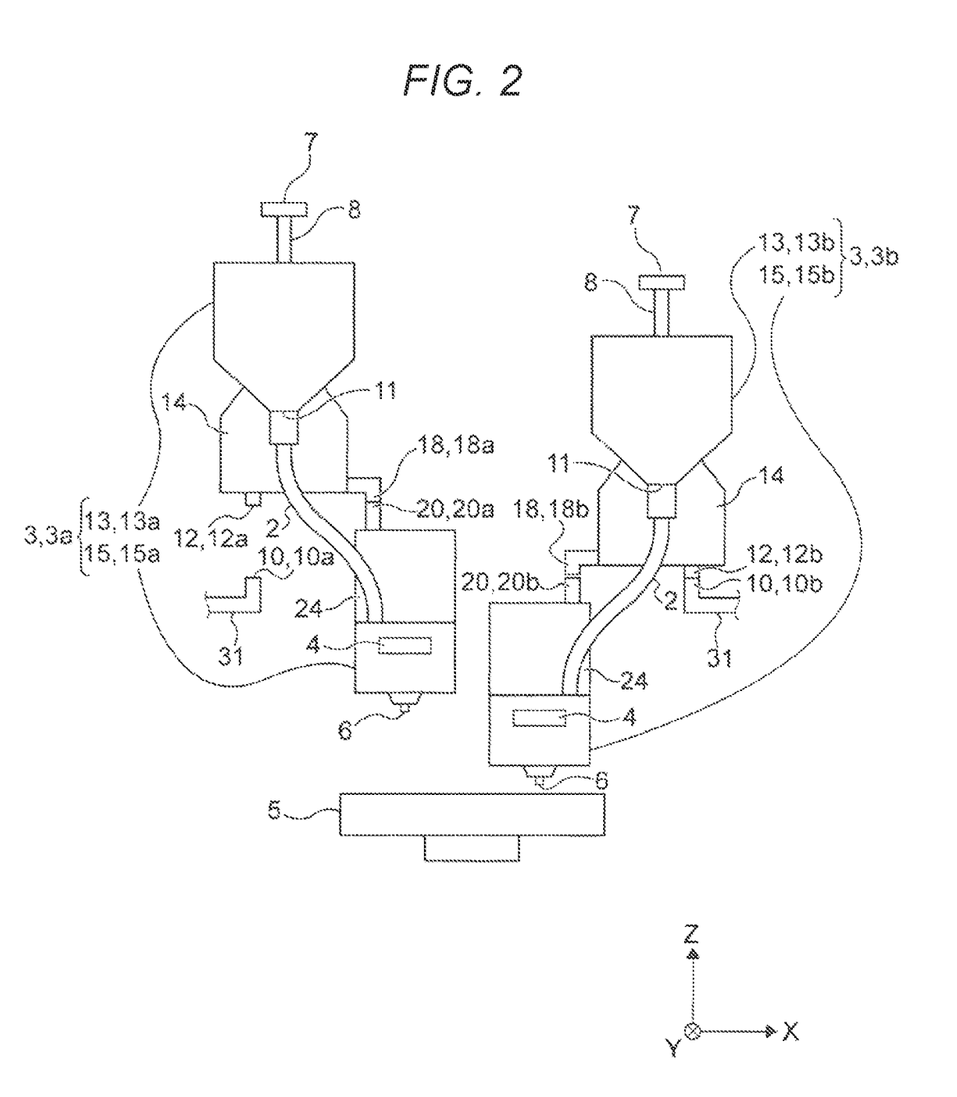
FIG. 2 is a schematic configuration diagram of the three-dimensional shaping device according to the first embodiment.

As shown in FIG. 2, the material dispensing device 3 includes two devices, which are a first material dispensing device 3a and a second material dispensing device 3b. Here, the first material dispensing device 3a dispenses a material that finally becomes a structural material of a shaped object itself. The second material dispensing device 3b dispenses a support material. When the first material dispensing device 3a is located at a shaping position to be described later and performs a dispensing operation, the second material dispensing device 3b is located away from the shaping position. When the second material dispensing device 3b is located at a shaping position to be described later and performs a dispensing operation, the first material dispensing device 3a is located away from the shaping position.

The second material dispensing device 3b is not limited to the device that dispenses the support material, and may be a device that dispenses a material that finally becomes a structural material of the shaped object itself. Furthermore, the material dispensing device 3 may include a third material dispensing device.

The first material dispensing device 3a and the second material dispensing device 3b have the same structure. In the following description, when the first material dispensing device 3a and the second material dispensing device 3b are distinguished from each other, alphabets a and b are attached to numerical reference numerals of constituent members, and when there is no need to distinguish them from each other, the constituent members may be described without attaching a and b.

Remaining Amount Detection Unit

Figure 4:
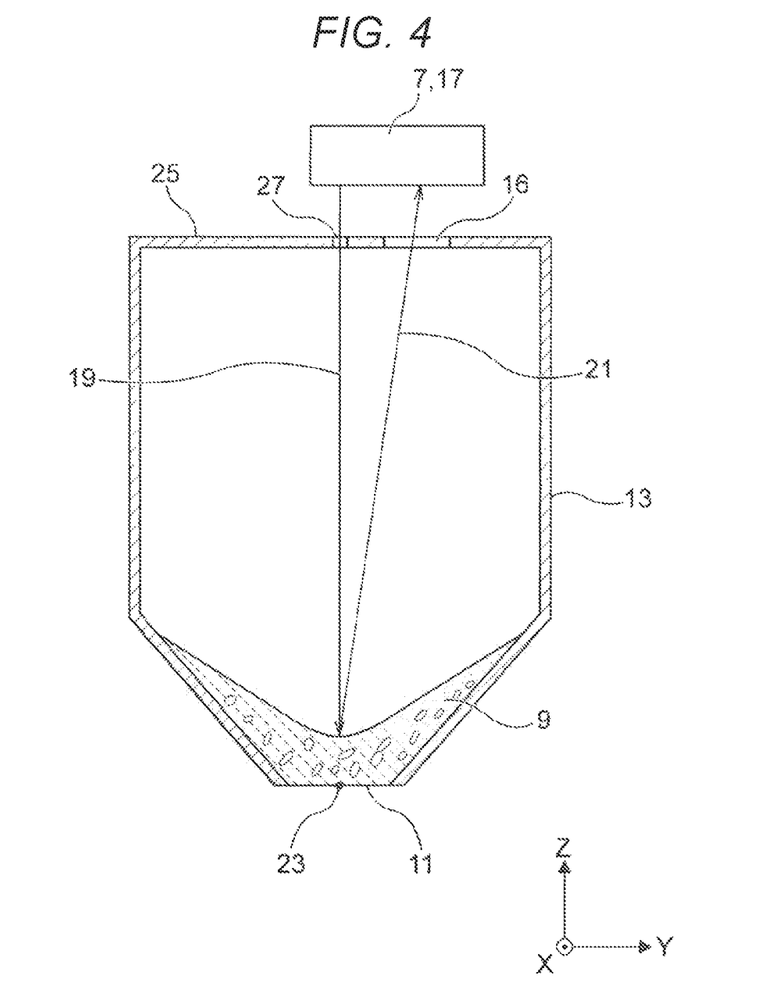
FIG. 4 is an enlarged cross-sectional view of a remaining amount detection unit and the material storage unit according to the first embodiment.

The remaining amount detection unit 7 is disposed above the material storage unit 13 by an arm 8. As shown in FIG. 4, the remaining amount detection unit 7 emits an emission wave 19 to an upper surface of the material 9, which is a target, present in the material storage unit 13. Then, the remaining amount detection unit 7 measures a distance to the material 9, which is the target, by receiving a reflected wave 21 from the target. That is, in the present embodiment, the remaining amount detection unit 7 is a distance measurement sensor 17 that measures the distance by the emission wave 19 and the reflected wave 21. Specific examples of the distance measurement sensor 17 include an optical sensor in which the emission wave 19 is light. Examples of the distance measurement sensor 17 include an ultrasonic sensor and a radio wave sensor in addition to the optical sensor.

The remaining amount detection unit 7 is not limited to the distance measurement sensor 17, and may be any device that can detect a remaining amount of the material 9 from above the material storage unit 13.

As shown in FIG. 4, the distance measurement sensor 17 as the remaining amount detection unit 7 emits light, which is the emission wave 19, toward a center 23 of the outlet portion 11. That is, the distance measurement sensor 19 measures the distance to a lowest portion of a mortar-shaped surface.

Figure 3:
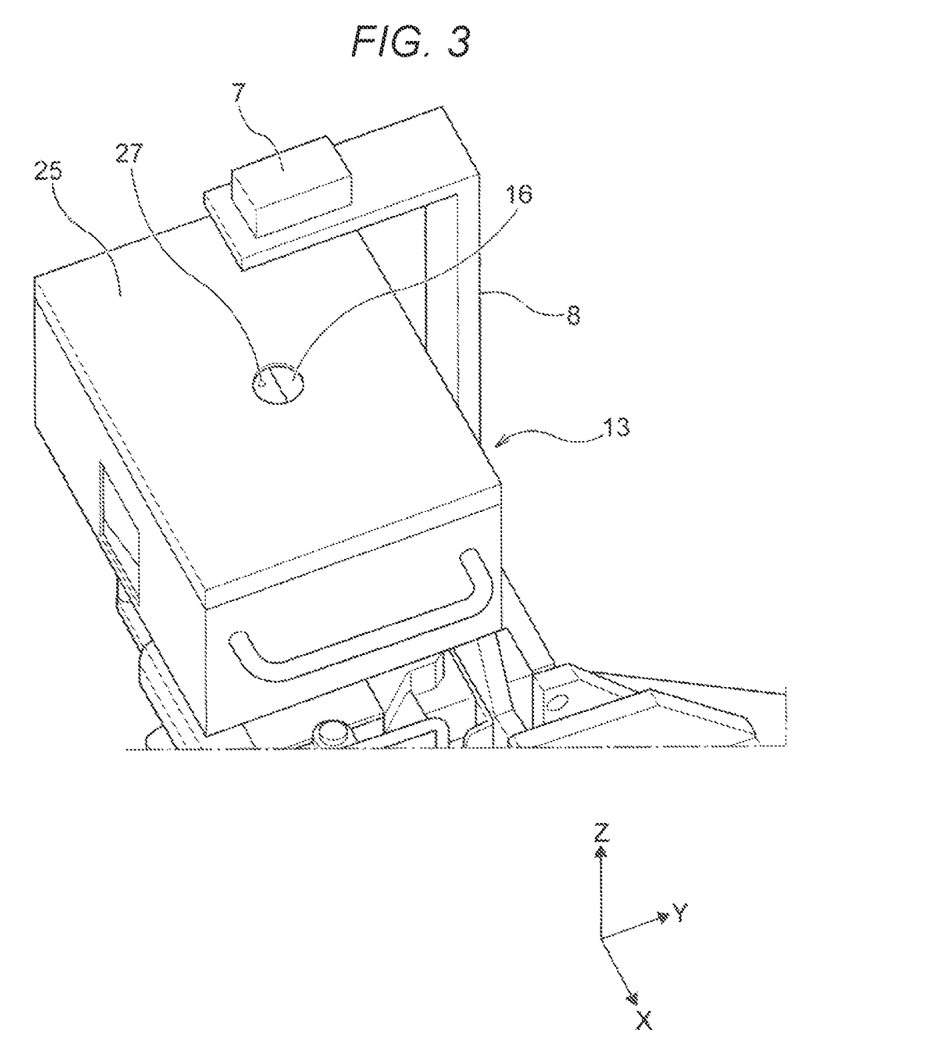
FIG. 3 is an enlarged perspective view of a material storage unit according to the first embodiment.

The material storage unit 13 further has a hole 27 forming a passage of the emission wave 19 in a member of an upper surface 25. The emission wave 19 passes through the hole 27 in a state where the material storage unit 13 is attached to a predetermined position. In other words, in a state where the material storage unit 13 is not correctly attached to the predetermined position, the emission wave 19 cannot pass through the hole 27. In FIGS. 3 and 4, reference numeral 16 denotes a transparent plate through which the reflected wave 21 passes.

As described above, since the hole 27 is formed, the distance measurement sensor 17 also serves as an attachment state confirmation sensor that confirms whether the material storage unit 13 is correctly attached to the predetermined position.

The hole 27 forming the passage of the emission wave 19 may not constitute the upper surface 25, and may be provided in a member inside the material storage unit.

Figure 5:
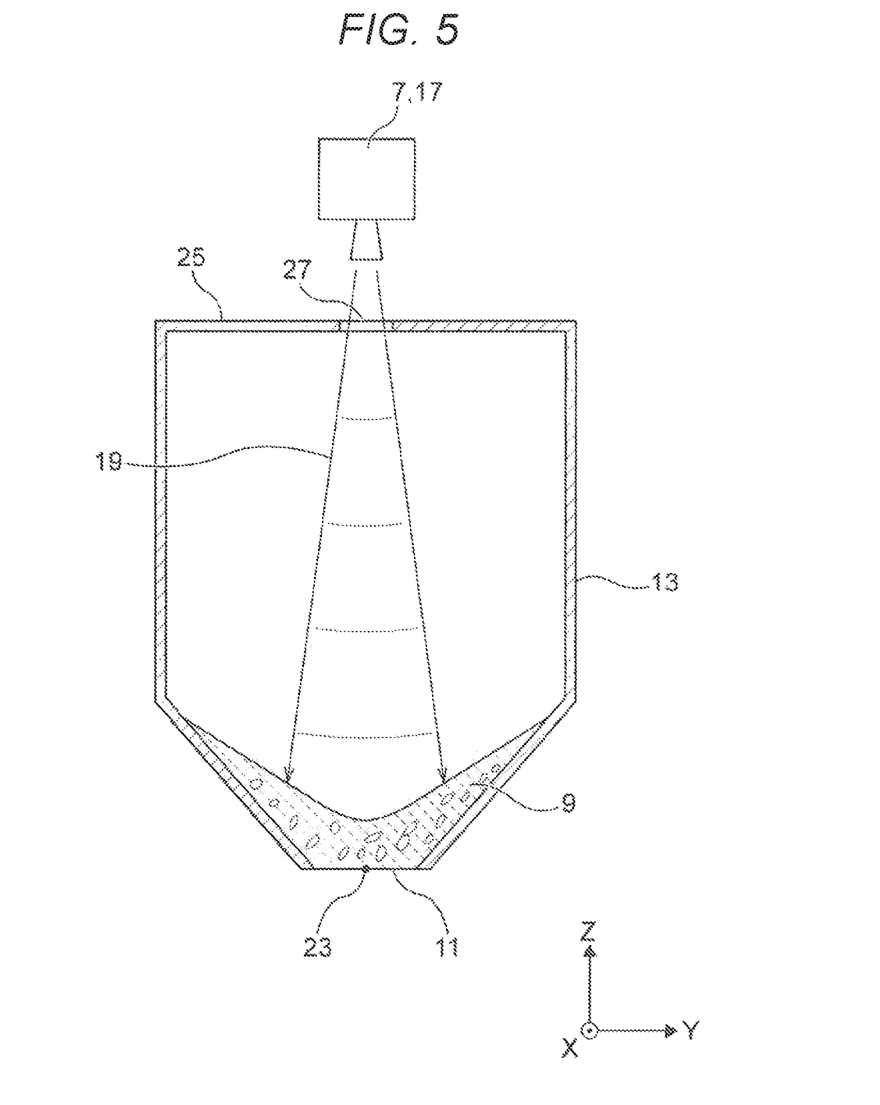
FIG. 5 is an enlarged cross-sectional view of the remaining amount detection unit and the material storage unit according to the first embodiment.

FIG. 5 is a diagram showing a case where the distance measurement sensor 17 is the ultrasonic sensor as the remaining amount detection unit 7. Corresponding to the ultrasonic sensor, the hole 27 through which the emission wave 19 passes is formed to have a diameter larger than that of a case of the optical sensor. Although not shown, the reflected wave 21 is received by the remaining amount detection unit 7 through the hole 27. Since the other configurations are the same as those of the optical sensor in FIG. 4, the same parts are denoted by the same reference numerals, and descriptions thereof will be omitted.

First Movement Unit, Second Movement Unit, and Third Movement Unit

As shown in FIG. 1, the three-dimensional shaping device 1 according to the present embodiment further includes a first movement unit 31 that moves the material storage unit 13 and the dispensing unit 15 in a first direction (Z-axis direction) 29 perpendicular to the stage 5. In addition, the three-dimensional shaping device 1 includes a second movement unit 33 that individually moves the material storage unit 13 in the first direction 29 and a third movement unit 35 that individually moves the dispensing unit 15 in the first direction 29. That is, the material storage unit 13 can be moved independently of the dispensing unit 15 in the first direction 29 by the second movement unit 33, and the dispensing unit 15 can be moved independently of the material storage unit 13 in the first direction 29 by the third movement unit 35.

In addition, the three-dimensional shaping device 1 includes the control unit 37 which controls movement operations of the first movement unit 31, the second movement unit 33, and the third movement unit 35. During shaping, the control unit 37 causes the third movement unit 35 to move the dispensing unit 15 (−Z direction), and causes the dispensing port 6 of a nozzle included in the dispensing unit 15 to be closer to the stage 5 than during a period other than during the shaping. That is, during the shaping, the third movement unit 35 positions the dispensing port 6 of the dispensing unit 15 at a shaping position.

First Regulating Unit and Second Regulating Unit

Figure 7:
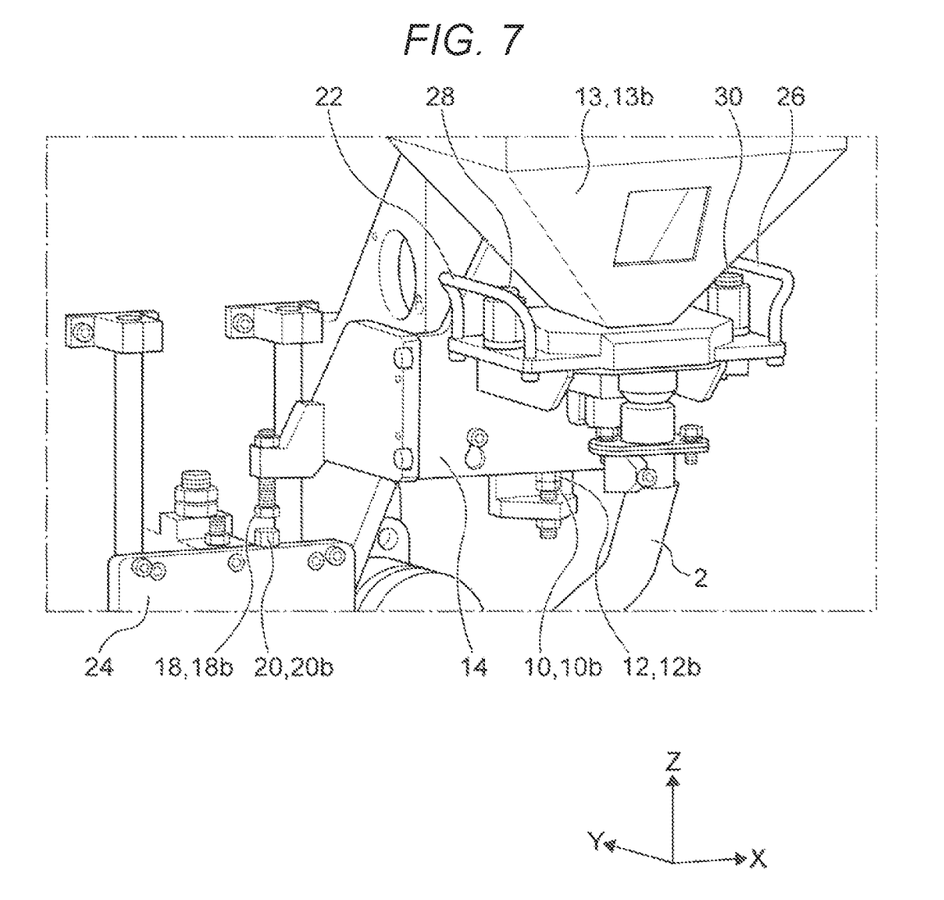
FIG. 7 is an enlarged perspective view of a part of the other material storage unit according to the first embodiment.

As shown in FIGS. 2 and 7, the three-dimensional shaping device 1 according to the present embodiment further includes a first regulating unit 10 fixed to the first movement unit 31 and a second regulating unit 12 fixed to the material storage unit 13. In FIG. 2, reference numeral 14 denotes a holding plate that holds the material storage unit 13, and reference numeral 24 denotes a holding plate that holds the dispensing unit 15.

When the control unit 37 causes the second movement unit 33 to move the material storage unit 13 toward the stage 5 (in the −Z direction), the movement of the material storage unit 13 is regulated at a position where the first regulating unit 10 and the second regulating unit 12 are in contact with each other.

First Contact Unit and Second Contact Unit

Figure 6:
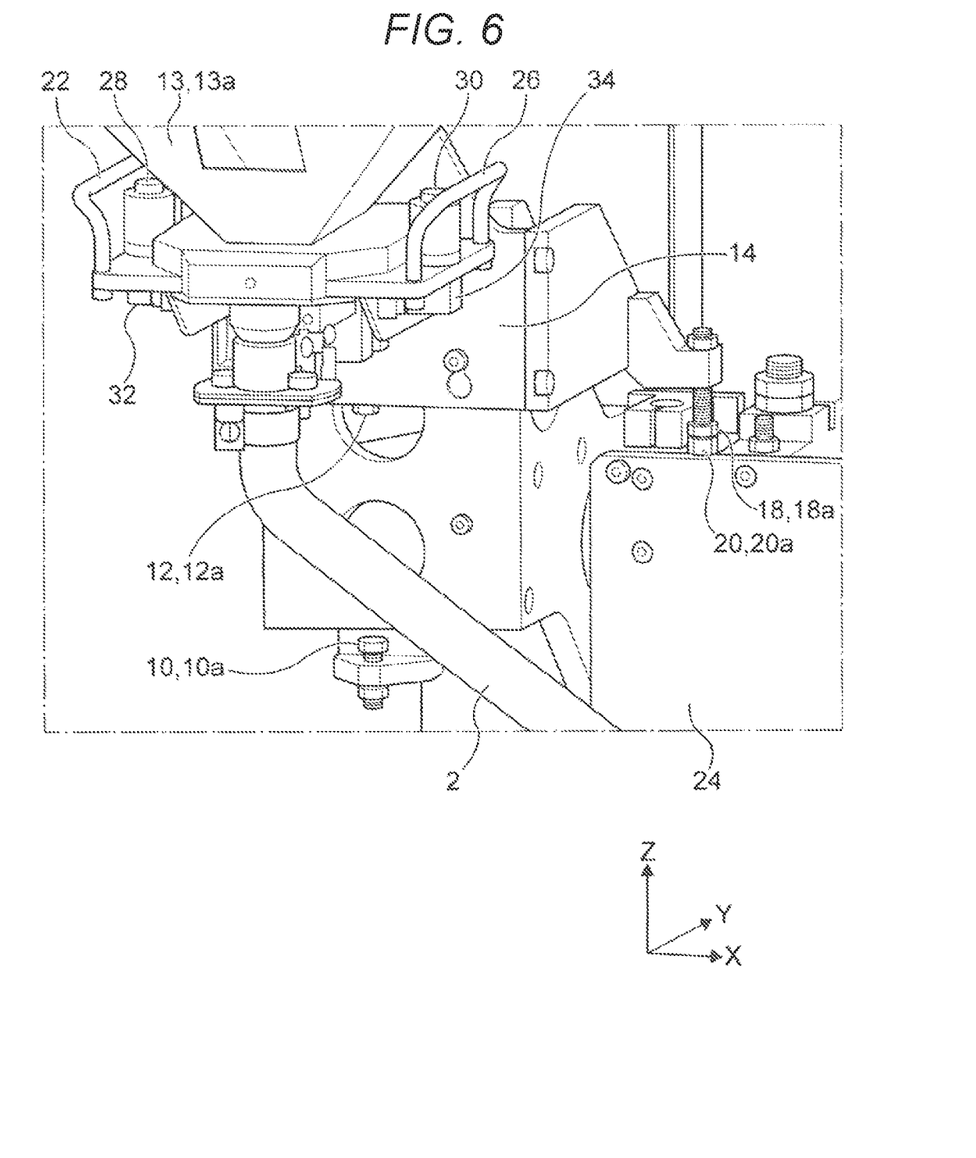
FIG. 6 is an enlarged perspective view of a part of one material storage unit according to the first embodiment.

As shown in FIGS. 2 and 6, the three-dimensional shaping device 1 according to the present embodiment further includes a first contact unit 18 fixed to the material storage unit 13 and a second contact unit 20 fixed to the dispensing unit 15.

When the control unit 37 causes the third movement unit 35 to move the dispensing unit 15 in a direction away from the stage 5 (+Z direction), the second contact unit 20 and the first contact unit 18 come into contact with each other and push up the material storage unit 13 in cooperation with the second movement unit 33.

As shown in FIGS. 6 and 7, in the present embodiment, the material storage unit 13 is attachable to and detachable from a coupling portion on a tube 2 side by one touch. Specifically, when the material storage unit 13 is removed, when a user grips left and right grip portions 22 and 26 with left and right hands and presses a pair of left and right attachment and detachment buttons 28 and 30, coupling with a pair of coupling portions 32 and 34 of the coupling portion on the tube 2 side is released and the material storage unit 13 can be removed. When the material storage unit 13 is attached, the material storage unit 13 can be attached by performing a procedure reverse to that described above.

When Material Storage Unit is Moved in Direction Away from Stage

When shaping processing by the first material dispensing device 3a is switched to shaping processing by the second material dispensing device 3b, the control unit 37 causes the second movement unit 33 to move a material storage unit 13a in the +Z direction, and causes the third movement unit 35 to move a dispensing unit 15a in the +Z direction. At this time, as shown in FIG. 2, the control unit 37 performs control such that a second contact unit 20a and a first contact unit 18a come into contact with each other and push up the material storage unit 13a in cooperation with the second movement unit 33.

When Material Storage Unit is Moved Toward Stage

When the shaping processing by the first material dispensing device 3a is switched to the shaping processing by the second material dispensing device 3b, the control unit 37 causes the second movement unit 33 to move a material storage unit 13b in the −Z direction and causes the third movement unit 35 to move a dispensing unit 15b in the −Z direction. At this time, the movement of the material storage unit 13b in the −Z direction is regulated at a position where a first regulating unit 10b and a second regulating unit 12b are in contact with each other.

Accordingly, the dispensing unit 15b is separated from the material storage unit 13b and is in an independent state. That is, since a load of the material storage unit 13b is not applied to the dispensing unit 15b, a position of the dispensing port 6 of the dispensing unit 15b in the Z-axis direction is less likely to be shifted.

Description of Effects of First Embodiment (1) According to the material dispensing device 3 of the present embodiment, the remaining amount detection unit 7 detects the remaining amount of the material 9 stored in the material storage unit 13 not from a side surface direction of the material storage unit 13 but from above. Accordingly, even when the material 9 stored in the material storage unit 13 has the mortar-shaped surface, it is possible to make the measurement less likely to be affected by the mortar-shaped surface, and therefore the remaining amount of the material 9 can be accurately and easily measured.

(2) According to the present embodiment, the remaining amount detection unit 7 is the distance measurement sensor 17 that is disposed above the material storage unit 13 and measures the distance to the target based on the emission wave 19 to the target and the reflected wave 21 from the target. Since the distance measurement sensor 17 measures the distance in a non-contact manner, the distance measurement sensor 17 can be easily designed and manufactured.

(3) According to the present embodiment, the distance measurement sensor 17 emits the emission wave 19 toward the center 23 of the outlet portion 11. Therefore, since the distance measurement sensor 17 measures the distance to the lowest portion of the mortar-shaped surface, it is possible to prevent in advance the material 9 from not being dispensed from the material storage unit 13.

(4) According to the present embodiment, the emission wave 19 passes through the hole 27 in a state where the material storage unit 13 is attached to the predetermined position. That is, in a state where the material storage unit 13 is not attached to the predetermined position, the emission wave 19 cannot pass through the hole 27. Accordingly, it is possible to easily check whether the material storage unit 13 is correctly attached to the predetermined position.

(5) According to the three-dimensional shaping device 1 of the present embodiment, since the material dispensing device 3 includes the remaining amount detection unit 7, it is possible to obtain the above-described effects of the material dispensing device 3 as the three-dimensional shaping device 1.

(6) According to the present embodiment, the three-dimensional shaping device 1 includes the first movement unit 31 that moves the material storage unit 13 and the dispensing unit 15 in the first direction 29 perpendicular to the stage 5, the second movement unit 33 that individually moves the material storage unit 13 in the first direction 29, and the third movement unit 35 that individually moves the dispensing unit 15 in the first direction 29. During the shaping, the control unit 37 causes the third movement unit 35 to move the dispensing unit 15, and causes the dispensing port 6 of a nozzle included in the dispensing unit 15 to be closer to the stage 5 than during a period other than during the shaping. That is, the dispensing port 6 is positioned at a shaping position. Accordingly, the above-described effects of the material dispensing device 3 can be obtained.

(7) According to the present embodiment, when the material storage unit 13 is moved in the direction toward the stage 5 by the second movement unit 33, the movement of the material storage unit 13 by a predetermined distance or more is regulated by the contact between the first regulating unit 10 and the second regulating unit 12. Accordingly, during the dispensing operation of the material 9 by the dispensing unit 15, the dispensing unit 15 is positioned independently of, that is, separated from the material storage unit 13. Therefore, it is possible to reduce a possibility that a dispensing position of the dispensing unit 15 is displaced.

(8) In addition, according to the present embodiment, when the control unit 37 causes the third movement unit 35 to move the dispensing unit 15 in the direction away from the stage 5, the second contact unit 20 and the first contact unit 18 come into contact with each other and push up the material storage unit 13 in cooperation with the second movement unit 33. This cooperation makes it easy to increase a capacity of the material storage unit 13, or makes it possible to reduce a size of a driving source of the second movement unit 33.

Second Embodiment

Next, an injection molding device according to a second embodiment will be described with reference to FIG. 8. The same components as those of the first embodiment are denoted by the same reference numerals, and the description thereof will be omitted.

Figure 8:
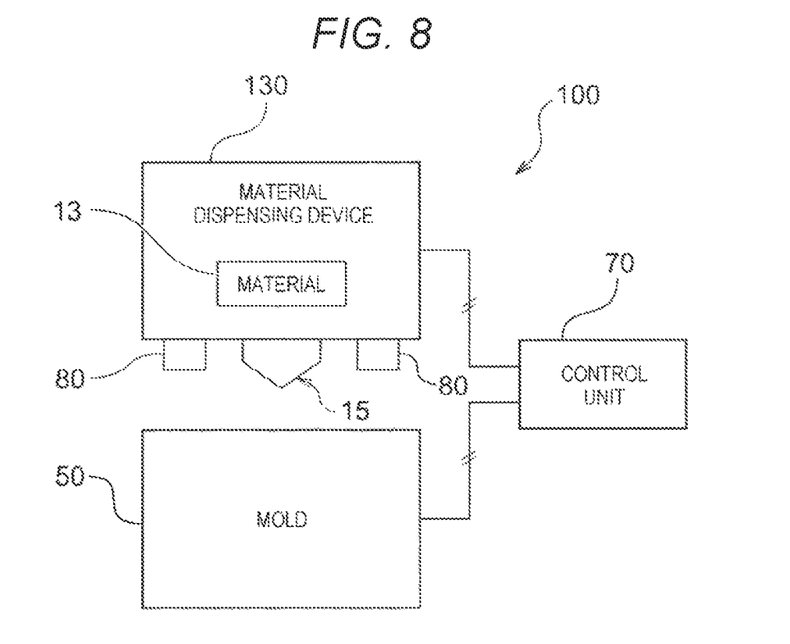
FIG. 8 is a schematic configuration diagram of an injection molding device according to a second embodiment.

As shown in FIG. 8, an injection molding device 100 according to the present embodiment includes a material dispensing device 130 that dispenses a material for injection molding, a fixing unit 80 that fixes a mold 50 that receives the material dispensed from the material dispensing device 130, and a control unit 70 that controls the dispensing of the material from the material dispensing device 130 to the mold 50 and a molding operation. The material dispensing device 130 includes the remaining amount detection unit 7, and basically has the same structure as that of the material dispensing device 3 according to the first embodiment.

According to the injection molding device 100 of the present embodiment, since the material dispensing device 130 includes the remaining amount detection unit 7, the same effect as that of the first embodiment as the injection molding device 100 can be obtained.

Other Embodiments

The material dispensing device 3 and the three-dimensional shaping device 1 including the material dispensing device 3 or the injection molding device 100 according to the present disclosure are based on the configuration of the embodiments described above, and it is needless to say that the partial configuration can be changed or omitted without departing from the gist of the present disclosure.

What is claimed is:

1. A three-dimensional shaping device comprising:
a material dispensing device configured to dispense a material for shaping from a dispensing unit; and
a stage configured to receive the material for shaping dispensed from the dispensing unit, wherein the material dispensing device comprises
a material storage unit configured to store a material therein and having an outlet portion at a lower portion thereof;
a dispensing unit configured to dispense the material supplied from the outlet portion to an outside with at least a part of the material being plasticized;
a remaining amount detection unit configured to detect a remaining amount of the material stored in the material storage unit from above the material storage unit;
a first movement unit configured to move the material storage unit and the dispensing unit in a first direction perpendicular to the stage;
a second movement unit configured to individually move the material storage unit in the first direction;
a third movement unit configured to individually move the dispensing unit in the first direction; and
a control unit configured to:
control movement operations of the first movement unit, the second movement unit, and the third movement unit, and
during shaping, the control unit causes the third movement unit to move the dispensing unit, and causes a dispensing port of a nozzle included in the dispensing unit to be closer to the stage than during a period other than during the shaping.

2. The three-dimensional shaping device according to claim 1, further comprising:
a first regulating unit fixed to the first movement unit; and
a second regulating unit fixed to the material storage unit, wherein
when the control unit causes the second movement unit to move the material storage unit toward the stage, the movement of the material storage unit is regulated at a position where the first regulating unit and the second regulating unit are in contact with each other.

3. The three-dimensional shaping device according to claim 1, further comprising:
a first contact unit fixed to the material storage unit; and
a second contact unit fixed to the dispensing unit, wherein
when the control unit causes the third movement unit to move the dispensing unit in a direction away from the stage, the second contact unit and the first contact unit come into contact with each other and push up the material storage unit in cooperation with the second movement unit.

4. An injection molding device comprising:
a material dispensing device configured to dispense a material for injection molding from a dispensing unit; and
a fixing unit configured to fix a mold that receives the material for injection molding dispensed from the dispensing unit, wherein
the material dispensing device is the three-dimensional shaping device according to claim 1.

5. The three-dimensional shaping device according to claim 1, wherein
the remaining amount detection unit is a distance measurement sensor that is disposed above the material storage unit and measures a distance to a target based on an emission wave to the target and a reflected wave from the target.

6. The three-dimensional shaping device according to claim 5, wherein
the distance measurement sensor is configured to emit the emission wave toward a center of the outlet portion.

7. The three-dimensional shaping device according to claim 5, wherein
the material storage unit includes a member having a hole configured to form a passage of the emission wave, and
the emission wave passes through the hole in a state where the material storage unit is attached to a predetermined position.

* * * * *